(12) United States Patent  
Martin (10) Patent No.: US 7,164,714 B2  
(45) Date of Patent: Jan. 16, 2007

(54) VIDEO TRANSMISSION AND PROCESSING SYSTEM FOR GENERATING A USER MOSAIC

(75) Inventor: Francois Martin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 746 days.

(21) Appl. No.: 10/076,330

(22) Filed: Feb. 15, 2002

(65) Prior Publication Data

US 2002/0154692 A1    Oct. 24, 2002

(30) Foreign Application Priority Data

Feb. 16, 2001 (FR) .................................. 01 02137

(51) Int. Cl.
*H04B 1/66* (2006.01)

(52) U.S. Cl. ................................. 375/240.01

(58) Field of Classification Search ........... 375/240.01, 375/240.1, 240.11; 348/563–565, 568; 725/86–87, 725/100

See application file for complete search history.

(56) References Cited

U.S. PATENT DOCUMENTS

| | | | | |
|---|---|---|---|---|
| 5,568,278 A | * | 10/1996 | Nakano et al. | 382/248 |
| 5,633,683 A | * | 5/1997 | Rosengren et al. | 375/240.01 |
| 6,324,215 B1 | * | 11/2001 | Katata et al. | 375/240.1 |
| 6,377,309 B1 | * | 4/2002 | Ito et al. | 348/554 |
| 6,539,545 B1 | * | 3/2003 | Dureau et al. | 725/48 |
| 6,721,360 B1 | * | 4/2004 | Itokawa | 375/240.11 |

FOREIGN PATENT DOCUMENTS

WO    WO9856176    4/1998

\* cited by examiner

*Primary Examiner*—Khanh Tran
(74) *Attorney, Agent, or Firm*—Larry Liberchuk (57) ABSTRACT

The invention relates to a transmission system and a processing system for video signals relating to TV programs, for the purpose of constructing a mosaic of TV programs displayed on a user's television set, allowing him to select a particular TV program quickly and in a relevant manner via a menu.

18 Claims, 5 Drawing Sheets

VIDEO TRANSMISSION AND PROCESSING SYSTEM FOR GENERATING A USER MOSAIC

The invention relates to a video transmission system and a video processing system for transmitting a set of video signals on a communication channel and for processing said video signals in order to improve their manipulation by a television viewer, respectively.

This invention may be used in video transmission systems utilized by broadcasters of television (TV) programs and by suppliers of video services for television on the one hand, and by a television viewer in a reception and processing system for TV video signals on the other hand.

With the emergence of digital television, the number of TV programs a user can display on his television set has increased considerably. In order to cope with this growth in TV programs and allow the user to choose from among this group of TV programs, a reduced representation referred to as a "mosaic" has been created, this mosaic comprising a juxtaposition on the user's television set of said TV programs in a reduced format. The user can thus see the contents of a group of TV programs simultaneously, which assists him in selecting a particular TV program.

The US patent published under U.S. Pat. No. 5,633,683 describes a system for selecting a TV program from a group of TV programs. The corresponding procedure comprises the transmission of a group of video signals, a video signal representing a mosaic obtained from said group of video signals, and information linking the position of each reduced-size video forming said mosaic to a program number from which it originates. Upon reception, the user selects his TV program by selecting from the mosaic the reduced-size video program which interests him, the corresponding selected program then replacing said mosaic on the television set.

The procedure for transmitting and receiving a video signal representing a mosaic used in the prior art document has a certain number of limitations.

Firstly, this procedure comes up against the problem of the maximum number of TV programs of reduced format that a mosaic can contain. In fact, since each TV program of reduced size must have a sufficiently large format so that the user can assess its content, a mosaic displayed on a television set of standard format will not reasonably be able to contain more than 16 reduced-size programs (4 programs horizontally×4 programs vertically). In the event that the user has the option of choosing a TV program from a relatively large group of TV programs, the number of TV programs being greater than 16 in particular, a mosaic will not be sufficient to display said group of TV programs. The user will therefore have to select a TV program from a plurality of mosaics, forcing him to move from one mosaic to another on his television set, thus making the selection of a TV program difficult and inconvenient.

Secondly, the mosaic created according to this process is an exhaustive and uniform representation of a group of TV programs. In fact, during the creation of the mosaic, each reduced-size TV program is juxtaposed without taking account of the nature of its content. Thus, when the user wishes to select a particular TV program on the mosaic, he has to look at each reduced-size program one after another in order to find the one with the content that corresponds to his expectations. The selection of a particular TV program by a user is therefore slow and may prove unreliable to the extent that the reduced-size program does not continuously reflect the type or style of TV program to which it relates.

The object of the invention is to remedy these limitations to a large extent by presenting a transmission and reception system for video signals relating to TV programs, in order to allow a user to select a particular TV program quickly and in a relevant manner from a mosaic of TV programs displayed on his television set.

According to one aspect of the invention, a video transmission system is provided for transmitting an output video signal on a communication channel from among a group of input video signals, said system comprising a first group of coding means in order to supply a coded video signal from each input video signal.

To this end, the present invention is characterized in that the transmission system also comprises:

a second group of coding means for supplying a sub-sampled video signal from each input video signal, association means for associating with each sub-sampled video signal a descriptor characterizing the corresponding input video signal, multiplexing means for multiplexing the group of said coded video signals with the group of said sub-sampled video signals associated with their descriptors, this multiplexing supplying said output video signal.

This transmission system relates more particularly to broadcasters of TV programs situated at the start of the chain of transmission to the users. In this system, a group of input video signals corresponding to TV programs are coded so as to supply a group of coded video signals in order particularly to reduce the bandwidth of each of them. In parallel, the input video signals are also coded so as to supply a group of coded video signals, this coding also including a reduction in the format of each input video signal by means of sub-sampling. Data descriptors are then associated with each sub-sampled video signal in order to characterize it by means of a group of fields such as its type, a program number, or various data describing its content. Multiplexing of the coded video signals and the associated data is subsequently carried out in order to supply a signal that is sent on a communication channel with the destination being a user.

In this transmission system, contrary to the prior art document, no mosaic signal is created from the sub-sampled video signals, thus leaving any possibility of composing a mosaic from these sub-sampled video signals to their reception at the user level.

According to another aspect of the invention, the transmission system can be implemented differently if the transmission is carried out by a supplier of video services for television. In this case, the supplier of services being an intermediary between a broadcaster of TV programs and a user, the video signals to be manipulated are of a different kind. A video transmission system is then provided for transmitting an output video signal on a communication channel from an input video signal, said input video signal resulting from the multiplexing of a group of coded video signals, said system comprising means of demultiplexing in order to generate said coded video signals.

To this end, the present invention is characterized in that the video transmission system also comprises:

transcoding means for supplying a sub-sampled video signal from each coded video signal, association means for associating with each sub-sampled video signal a descriptor characterizing the corresponding coded video signal, multiplexing means for multiplexing the said input video signal with the group of said sub-sampled video signals associated with their descriptors, this multiplexing supplying said output video signal.

In this transmission system, the input signals correspond to multiplexed coded video signals relating to TV programs. After demultiplexing, these coded video signals are transcoded so as to supply a new group of coded video signals, the transcoding also including a reduction in the format of each input video signal by means of sub-sampling. In a similar manner to the foregoing transmission system, data descriptors are associated with each sub-sampled video signal. Multiplexing of the coded video signals and the associated data is subsequently carried out in order to supply a single signal that is sent on a communication channel with the destination being a user.

In the same way, no mosaic signal is created from the sub-sampled video signals, thus leaving any possibility of composing a mosaic from these sub-sampled video signals to their reception at the user level.

According to an additional characteristic of the invention, the sub-sampled video signals are coded in accordance with the MPEG-4 standard. This allows great flexibility with regard to their manipulation when each sub-sampled video signal becomes a video object manipulated as such.

According to another aspect of the invention, a video processing system is provided for receiving, via a communication channel, an input video signal resulting from the multiplexing of a group of coded video signals, said system comprising demultiplexing means in order to generate said coded video signals and decoding means in order to decode said coded signals and generate decoded video signals that can be displayed on a screen.

To this end, the present invention is characterized in that the video reception and processing system also comprises:

means for receiving an auxiliary signal resulting from the multiplexing of a group of sub-sampled video signals, each sub-sampled video signal resulting from the sub-sampling of a coded video signal, a data descriptor being associated with each sub-sampled signal in order to characterize it by means of a group of fields, means for creating a database so as to store the fields of said data descriptors and to identify a sub-sampled video signal by means of a request referring to a group of fields, means for creating a mosaic from a limited group of sub-sampled video signals selected from said group of sub-sampled video signals, said selected sub-sampled video signals corresponding to those sub-sampled video signals for which the fields of the associated descriptors are the result of a user request sent to said database.

This video processing system is dedicated to the reception and processing of an input video signal corresponding to the output video signal generated by one of the video transmission systems referred to in the foregoing.

Contrary to the prior art document, where a mosaic of programs is implemented with the group of sub-sampled video signals, the object of this processing system is to create a user mosaic from a limited group of sub-sampled video signals, allowing a user to select a particular TV program quickly from a single mosaic of TV programs.

In addition, contrary to the prior art document where the mosaic of TV programs is imposed on the user, this processing system according to the invention allows the user to compose the mosaic from sub-sampled video signals where the corresponding TV program is in accord with his tastes or profile, thus facilitating his choice.

The invention also concerns a receiver for a television set comprising a video reception and processing system as presented above.

The invention also concerns a digital signal composed of a group of primary video signals coded in accordance with the MPEG-2 standard. This signal is characteristic in that it reflects technical features of transmission systems presented above. Indeed, this signal also comprises a group of secondary video signals coded in accordance with the MPEG-4 standard, each secondary video signal being obtained successively by means of sub-sampling of a primary video signal and subsequent encoding in accordance with the MPEG-4 standard, each MPEG-4 video signal being associated with a descriptor characterizing the corresponding primary video signal.

The invention also concerns a computer program product for transmission systems as presented above, as well as a computer program product for a processing system as presented above. Said computer products comprising a sequence of program code instructions for executing the processing steps of the invention by a signal processor.

These and other aspects of the invention are apparent from and will be elucidated, by way of non-limiting example, with reference to the embodiment(s) described hereinafter.

The following explanations are given on the basis that the video signals corresponding to the TV programs displayed on the user's television set, where they are coded, are so coded in accordance with the MPEG-2 ISO/IEC 13818-2 standard, but it will be obvious to those skilled in the art that the invention may also be used in the same manner if these video signals are coded in accordance with other video standards such as the MPEG-1 standard In the same way, in the interests of clarity, the explanations are given on the basis of only four TV programs. The invention is obviously not limited to this restricted number of programs and can be used with a greater number of TV programs.

Figure 1:
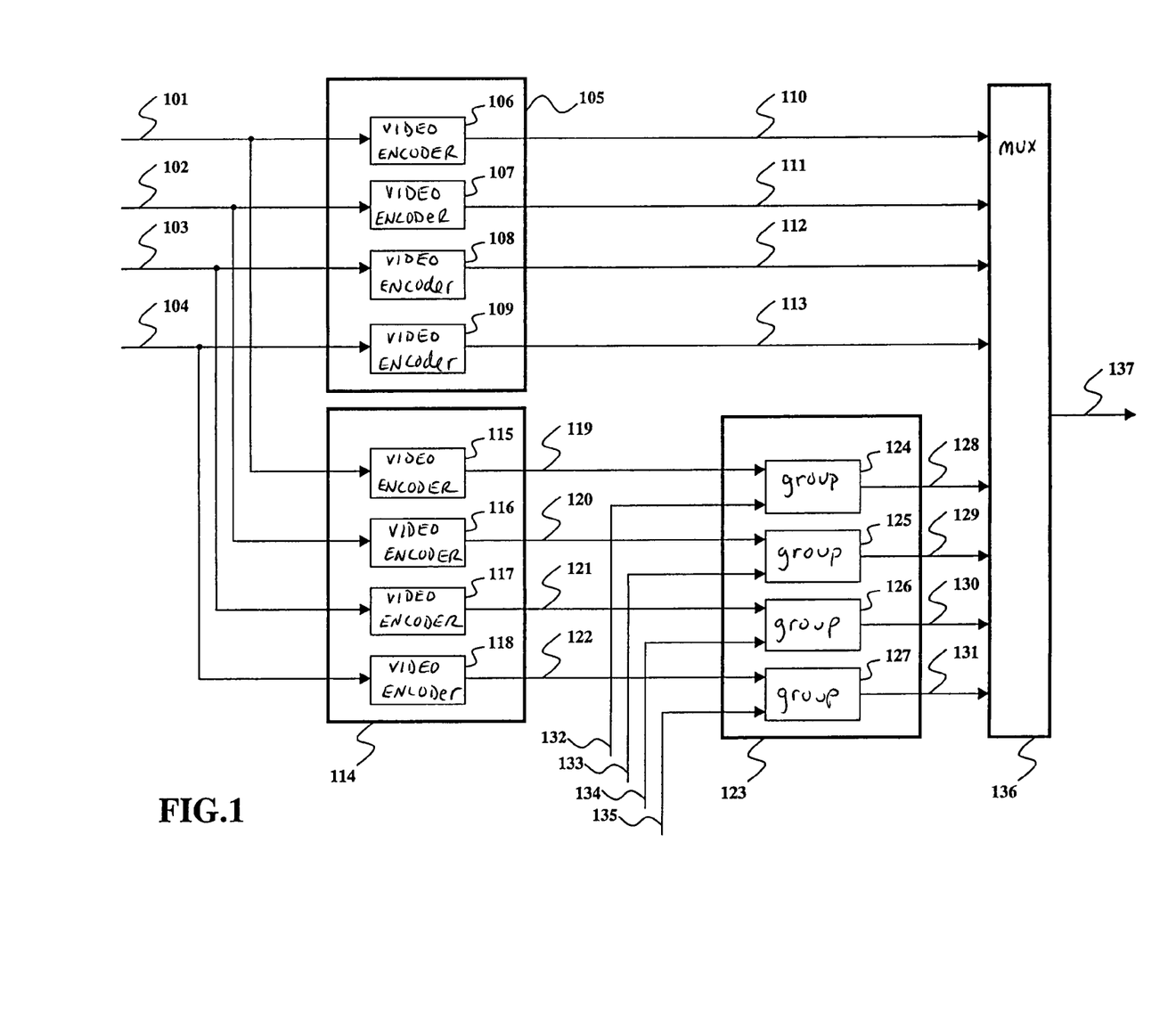
FIG. 1 shows a first embodiment of a video transmission system according to the invention.

FIG. 1 shows a first embodiment of a video transmission system according to the invention. This embodiment is used if the transmission is carried out by a broadcaster of TV programs.

This transmission system receives a group of four TV programs via the video signals 101–104 originating, for example, from a video capture system (not shown). These signals 101–104, in raw format, are applied to a video encoding system 105 in which each of the signals 101–104 is encoded by means of respective video encoders 106–109, resulting in the signals 110–113 encoded in accordance with the MPEG-2 standard. In parallel, the signals 101–104 are applied to a video encoding system 114 in which each of the signals 101–104 is sub-sampled and then encoded by means of respective video encoders 115–118 in accordance with the MPEG-4 ISO-IEC 14496-2 standard, resulting in the signals 119–122. The object of the sub-sampling step is to generate video signals 119–122 with a reduced format compared with the format of signals 101–104. The sub-sampling factor may have different values. For example, horizontal and vertical sub-sampling by a factor 4 applied to the signals 101–104 with a format CCIR will allow signals 119–122 to be generated with a format QCIF, while horizontal and vertical sub-sampling by a factor 8 applied to the signals 101–104 with a format CCIR will allow signals 119–122 to be generated with a format SUB-QCIF. The value of the sub-sampling factor determines the maximum number of sub-sampled video signals that can be displayed on the same screen. As the association 123 means, data descriptors 132–135, for example originating from a database (not shown), are associated with the signals 119–122. The association means 123 comprise 4 groups 124–127 each allowing a data descriptor to be attached or linked to a sub-sampled video signal, thus resulting in new signals 128–131. These data descriptors allow, by means of a group of fields, each of the sub-sampled signals 119–122, and at the same time each of the TV programs 101–104 from which the signals 119–122 originate, to be characterized.

Table 1 describes in a non-limitative manner the fields contained in each data descriptor associated with a sub-sampled signal. Each data descriptor comprises a group of fields arranged in several sub-groups:

an "identification" sub-group comprising an identifier field bearing the reference 1. The object of this field is to identify each descriptor so that no confusion arises with the other descriptors.

a "filtering" sub-group comprising two fields bearing the references 2 and 3 for classifying the TV program according to its type with a growing degree of refinement, the type at level 2 specifying the type at level 1. For example, the type at level 1 can be chosen from the types (film, documentary). If the type at level 1 is (film), the type at level 2 is chosen from (drama, comedy, adventure). If the type at level 1 is (documentary), the type at level 2 is chosen from (science, history, nature).

a "description" sub-group comprising the fields bearing the references 4, 5, 5 and 7. These fields allow additional indications to be provided on the TV program with regard to its content. Field 7 allows each sub-sampled signal 119–122 to be linked to the corresponding TV program carried by one of the video signals 101–104.

TABLE 1

| | Field number |
|---|---|
| DESCRIPTOR_PROG_TV | |
| ( | |
| IDENTIFICATION | |
| id | 1 |
| FILTERING | |
| type level 1 | 2 |
| type level 2 | 3 |
| DESCRIPTION | |
| title | 4 |
| producer | 5 |
| duration | 6 |
| station number | 7 |
| ) | |

The data descriptors 132–135 associated with the sub-sampled video signals are constructed in accordance with the prescribed syntax DVB-SI (from the English Digital Video Broadcast-Service Information) as described in the document "Digital Broadcasting Systems for Television, Sound and Data Services; Specification for Service Information (SI) in Digital Video Broadcasting (DVB) Systems", ITU-Radio communication study groups, Doc 11-3/45-E, Aug. 29, 1996. However, alternative syntaxes for constructing descriptors may be envisaged, such as a syntax in accordance with the MPEG-7 standard allowing fields to be defined in a free manner in order to obtain a more precise degree of description of each TV program. In the same way, the descriptors according to the invention may be constructed in accordance with the MPEG-4 standard if each TV program is also described by technical video characteristics such as the shape of the objects or the patterns which compose it.

After multiplexing of the signals 110–113 in an intermediate transport stream (not shown) by means of a multiplexer 136 in accordance with the standard MPEG-2 System 13818-1, the signals 128–131 are encapsulated and multiplexed, still by means of 136, in said intermediate transport stream in accordance with Amendment 7 of the MPEG-2 System 13818-1 standard, in order to result in an output signal 137 transmitted over a communication channel.

Figure 2:
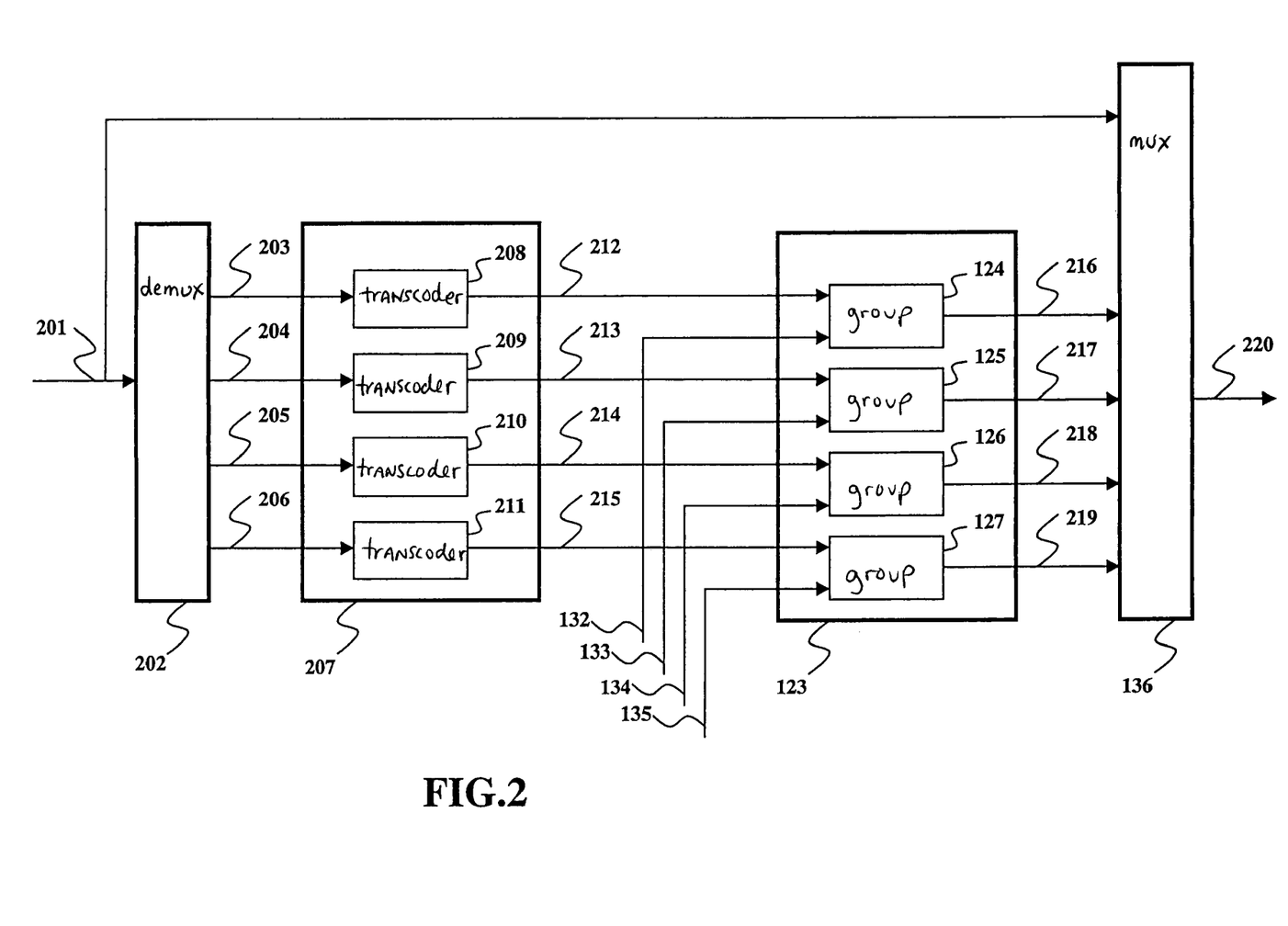
FIG. 2 shows a second embodiment of a video transmission system according to the invention.

FIG. 2 shows a second embodiment of a video transmission system according to the invention. This embodiment is used if the transmission is carried out by a supplier of video services.

In this case, a transport stream 201 is received, comprising 4 video signals encoded in accordance with the MPEG-2 standard and multiplexed,. The 4 encoded video signals are extracted from the transport stream 201 and demultiplexed by the demultiplexer 202, resulting in the video signals 203–206. These 4 video signals 203–206 encoded in accordance with the MPEG-2 standard undergo a transcoding operation 207 so as to generate video signals encoded in accordance with the MPEG-4 standard. This transcoding operation includes 4 transcoders 208–211 allowing the video signals 212–215 encoded in accordance with the MPEG4 standard to be generated. In addition to this change in coding syntax, each transcoder carries out a sub-sampling of the signals 203–206 in an identical manner to the embodiment of FIG. 1. This transcoding operation 207 may be carried out in several ways. Firstly, it may comprise a MPEG-2 decoding of the signals 203–206 so as to access the non-coded video data, MPEG-4 encoding then being carried out on this non-coded video data in order to generate the video signals 212–215. However, this operation necessitates expensive processing means, so that an operation comprising a direct manipulation of the signals 203–206 without previous decoding will be preferred. In an identical manner to the embodiment of FIG. 1, data descriptors 132–135 are associated with the sub-sampled video signals 212–215 so as to generate the signals 216–219. In the final operation, the transport stream 201 and the signals 216–219 are multiplexed and encapsulated in a new transport stream by means of the multiplexer 136, resulting in the output signal 220 transmitted over a communication channel.

In the video transmission systems described above, the sub-sampled video signals encoded in accordance with the MPEG-4 standard may have a frame frequency lower than that of the video signals corresponding to the TV programs. The bandwidth of the output signal 220 is thus reduced in generating the signals 119–122 or the signals 212–215, respectively, during the encoding 114 or the transcoding 207, with a low frame frequency. At the extreme, it should be noted that if the frame frequency of these signals is zero, a TV program is represented by a single image.

Figure 4:
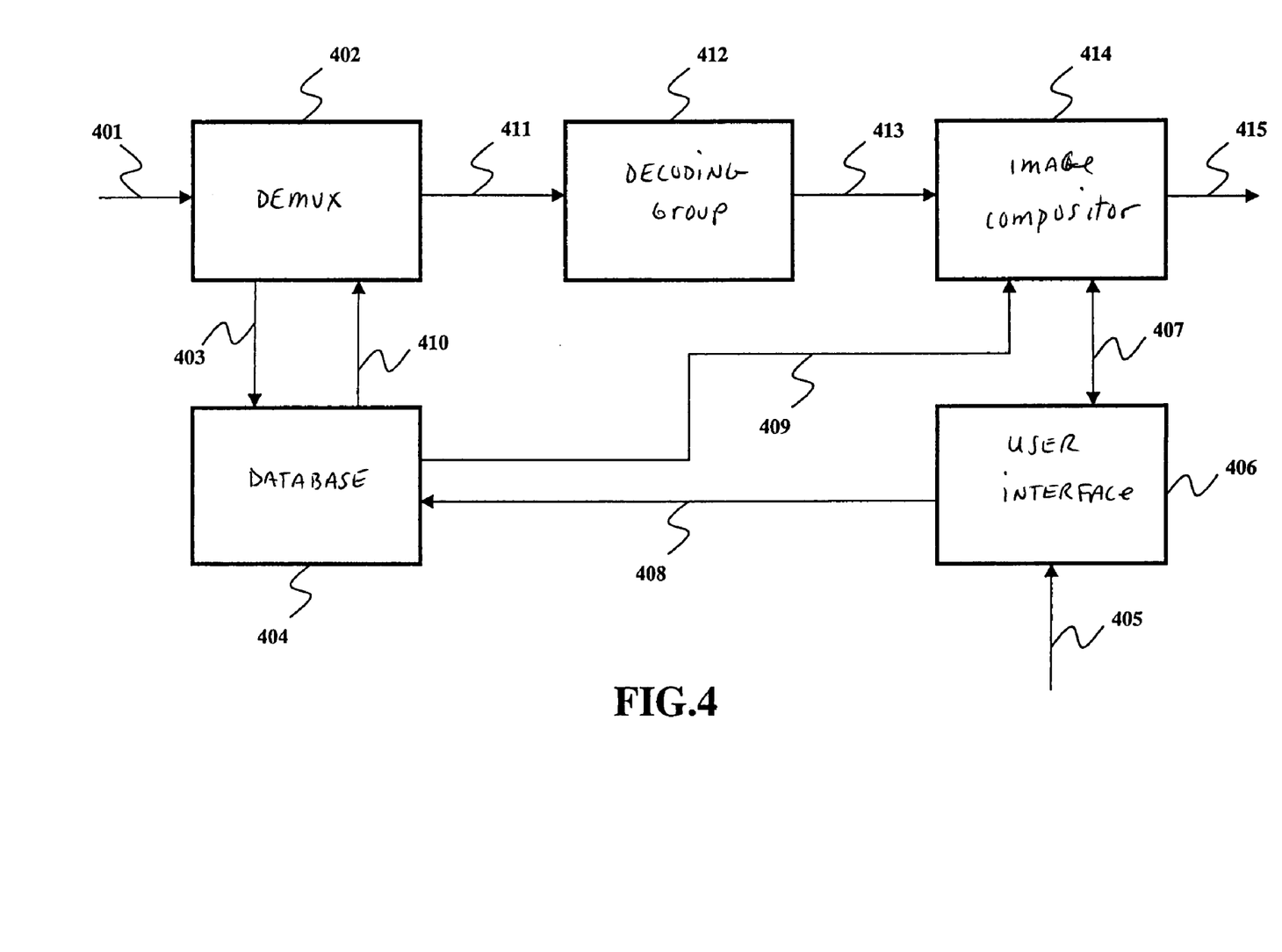
FIG. 4 is a schematic view of a video reception and processing system according to the invention.

FIG. 4 is a schematic view of a video reception and processing system according to the invention. This video reception and processing system is designed to receive and process the output signal generated by one of the transmission systems described above with reference to FIG. 1 or 2. Its object is to create a user mosaic from a limited group of sub-sampled video signals, allowing a user to select a particular TV program quickly from a single mosaic of TV programs displayed on his television set.

This reception system comprises a demultiplexer 402 for demultiplexing the input signal 401 so as to generate the video signals 411, composed of TV programs encoded in accordance with the MPEG-2 standard and sub-sampled video signals encoded in accordance with the MPEG-4 standard on the one hand, and the data descriptors 403 which allow the content of each TV program to be described on the other hand. A database 404 is then formed from the different fields of each descriptor. Following an action 405, via the user interface 406, generated by a user situated at the reception system, and comprising choosing a type of TV program from a textual or graphical menu displayed on the television set, a request 408 taking up the user's choice is generated and sent to the database 404. In response to this request, the database determines which TV programs correspond to the user's choice and, via the command 410, authorizes the demultiplexing of the sub-sampled video signals originating from these determined TV programs. This limited group of sub-sampled video signals is then decoded by the decoding group 412, composed in particular of decoders in accordance with the MPEG-4 standard, in order to supply decoded sub-sampled video signals 413. These video signals are then assembled in the form of a mosaic by means of an image compositor 414, this assembling comprising a juxtaposition of the sub-sampled video signals in the same image plane. The mosaic 415 thus created is sent to a display system such as the user's television set. Descriptive data 409 for each sub-sampled video signal may also be inserted in the mosaic during its composition. The user therefore has a mosaic available showing a group of reduced-format TV programs corresponding to his choice. He can thus easily select a reduced-format TV program from the mosaic via the command 407, which entails the demultiplexing by 402 and decoding by 412 of the corresponding TV program encoded in accordance with the MPEG-2 standard, which is then displayed on the user's television screen.

Figure 3:
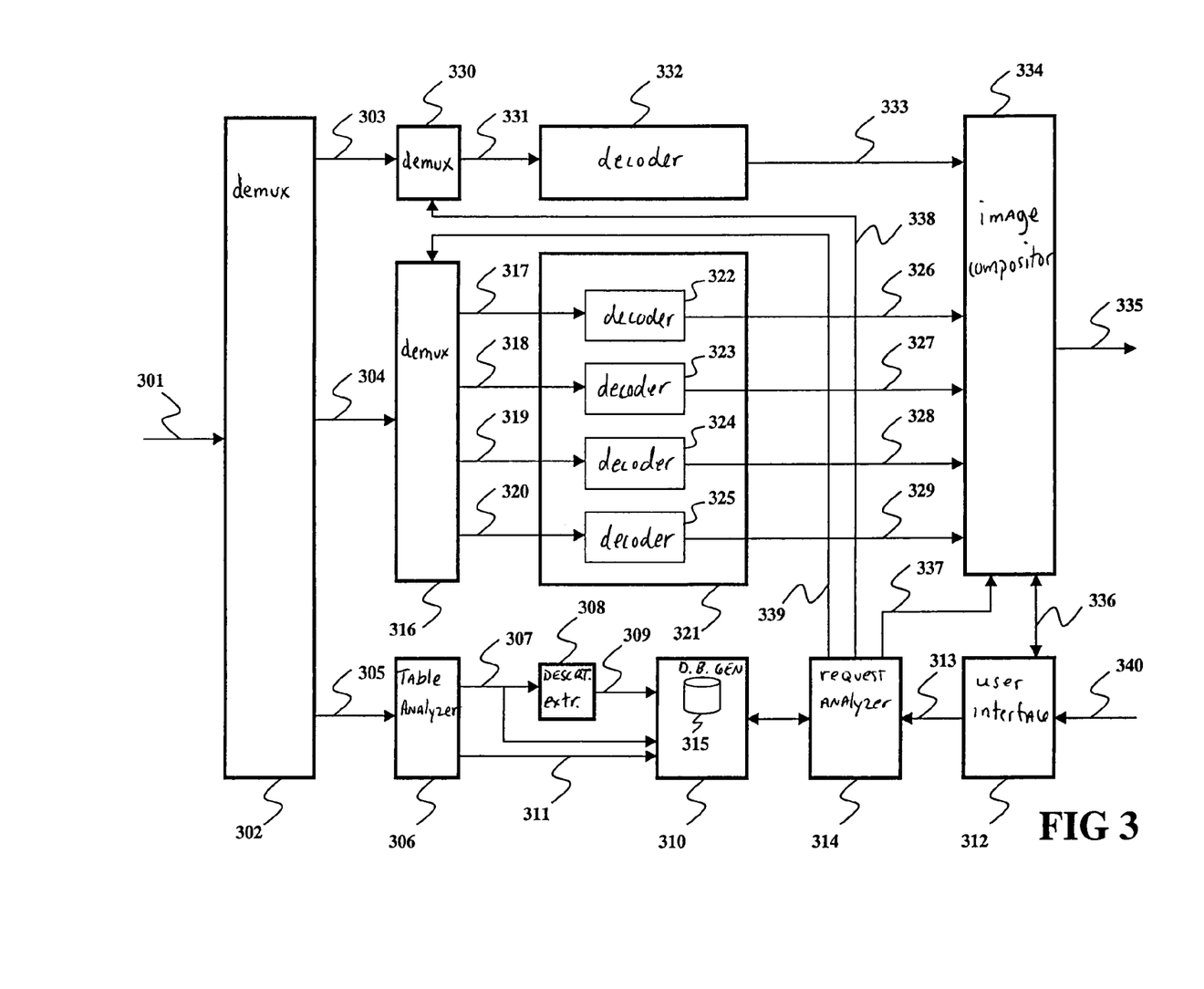
FIG. 3 shows a detailed embodiment of a video reception and processing system according to the invention.

FIG. 3 shows a detailed embodiment of a video reception and processing system as illustrated schematically in FIG. 4 according to the invention.

This video reception and processing system is designed to receive and process the input signal 301 corresponding to the output signal generated by one of the transmission systems described above with reference to FIGS. 1 or 2. This signal 301 corresponds to a transport stream. It is first demultiplexed by the demultiplexer 302 in order to generate a transport stream 303 containing the 4 TV programs encoded in accordance with the MPEG-2 standard, a transport stream 304 containing the 4 sub-sampled video signals encoded in accordance with the MPEG-4 standard, as well as a signal 305 containing the 4 data descriptors associated with the 4 sub-sampled signals. The signal 305 is analyzed by means of a table analyzer 306 with the object of supplying the group of fields 307 for each data descriptor on the one hand, but also program identification parameters (PID) 311 allowing a link to be established between a sub-sampled video signal and the corresponding TV program. A descriptor extractor 308 allows the type information 309 provided by field nos. 2 and 3 of table 1 to be read and extracted from the signal 307. A database 315, preferably of the relational type, is then created by the database generator 310, each cell in this database being filled from the data carried by the signals 307, 309 and 311. The user selects a title from said menu corresponding to the type of TV program that he wishes to watch via the user interface 312 by means of a choice 340 from a menu (not shown) generated and displayed on his television set, taking a title from the different filtering fields of the descriptors. A request 313 reflecting the user's choice is then generated. The content of this request is analyzed by the request analyzer 314 in order to analyze the user choice contained in the request, in particular what type of program he has chosen. The request analyzer 314 then consults the database 315 in order to determine, from amongst all the TV programs received (which are 4 in number in this case), those TV programs which meet the criteria of the request. A limited group of TV programs corresponding to the user's selection is thus defined, each program being identified by its identification field id (cf. Table 1) originating from its data descriptor. The request analyzer sends the identifiers 339 to the demultiplexer 316 so as to demultiplex only those sub-sampled video signals which belong to this limited group of TV programs. A limited group of sub-sampled video signals 317–320 encoded in accordance with the MPEG-4 standard is supplied. Here, 4 sub-sampled video signals are shown, but a smaller number of signals may be supplied depending on the result of the user request. The limited group of sub-sampled video signals 317–320 is decoded by the decoding system 321 composed of the decoders 322–325 in accordance with the MPEG-4 standard, supplying the decoded sub-sampled video signals 326–329. These decoded signals are then assembled in the form of a mosaic by means of an image compositor 334, this compositor juxtaposing the different sub-sampled video signals in the same plane. During this composition, additional data 337 corresponding to fields 4, 5, 6 and 7 (cf. Table 1) of the data descriptors relating to the limited group of sub-sampled video signals may be inserted into the mosaic of TV programs in order to provide additional information to the user watching the mosaic thus created and displayed on his television set, the mosaic being carried by the output signal 335. The user therefore has available a mosaic of TV programs satisfying his choice. Via the user interface 312, the user selects the reduced-format TV program (i.e. the sub-sampled video signal) from the mosaic, with the aid, for example, of a remote control equipped with movement arrows allowing a selection cursor to be moved from one reduced-format program to another in the mosaic and a confirmation button allowing the reduced-format program where the selection cursor is positioned to be selected. Following this action 336, the analyser 314 determines the identifier of the reduced-format TV program selected by the user, and sends it via 338 to the demultiplexer 330. From amongst the group of TV programs contained in the signal 303, the demultiplexer 330 demultiplexes and supplies the signal 331 corresponding to the identifier 338. A decoder 332 in accordance with the MPEG-2 standard decodes the signal 331 and supplies the decoded signal 333 corresponding to the TV program selected by the user. This TV program then replaces the program mosaic on the user's television set.

In an alternative embodiment, the selection of the sub-sampled video signals composing the mosaic is carried out in a direct manner by the user, without having to choose a type of TV program from a menu. To do this, the user selects the programs he wishes to include in his preferred mosaic one after another from among the group of all TV programs contained in the signal 301. A new field "pref_mosaic" is then added to each data descriptor, which is validated in order to indicate that a sub-sampled video signal must be utilized during the creation of the user's preferred mosaic. In this manner, the user creates his own user profile which can be stored locally. When the user wishes to select a particular TV program, a user action 340 (via a remote control button, menu, etc.) triggers a search by 314 in the database 315 for all the descriptors whose field pref_mosaic is validated, which allows the limited group of sub-sampled video signals forming the user's preferred mosaic to be defined, the latter mosaic being created and displayed as described in the foregoing. The user only has to select the TV program that he wishes to display on his television set from his preferred mosaic.

In order to present the user with an updated mosaic of TV programs taking account of the program changes which may occur on a given station, an update of the database 315 is carried out in a continuous manner or periodically. To do this, the database generator 310 checks, for each TV program identified by its program identifier 311, whether the fields of its associated data descriptor previously stored in the database 315 are identical to the fields 307–309 received at the present moment. If so, the database 315 is not updated since the TV programs received are identical, particularly as regards their type. In the opposite case, an update of the database 315 is carried out by replacing the fields of the data descriptors stored previously with the new fields 307–309 received. For example, an update of the database 315 is carried out if a television station, referenced by its program identifier 311, begins to broadcast a documentary whereas a film was broadcast up to the present moment.

Figure 5:
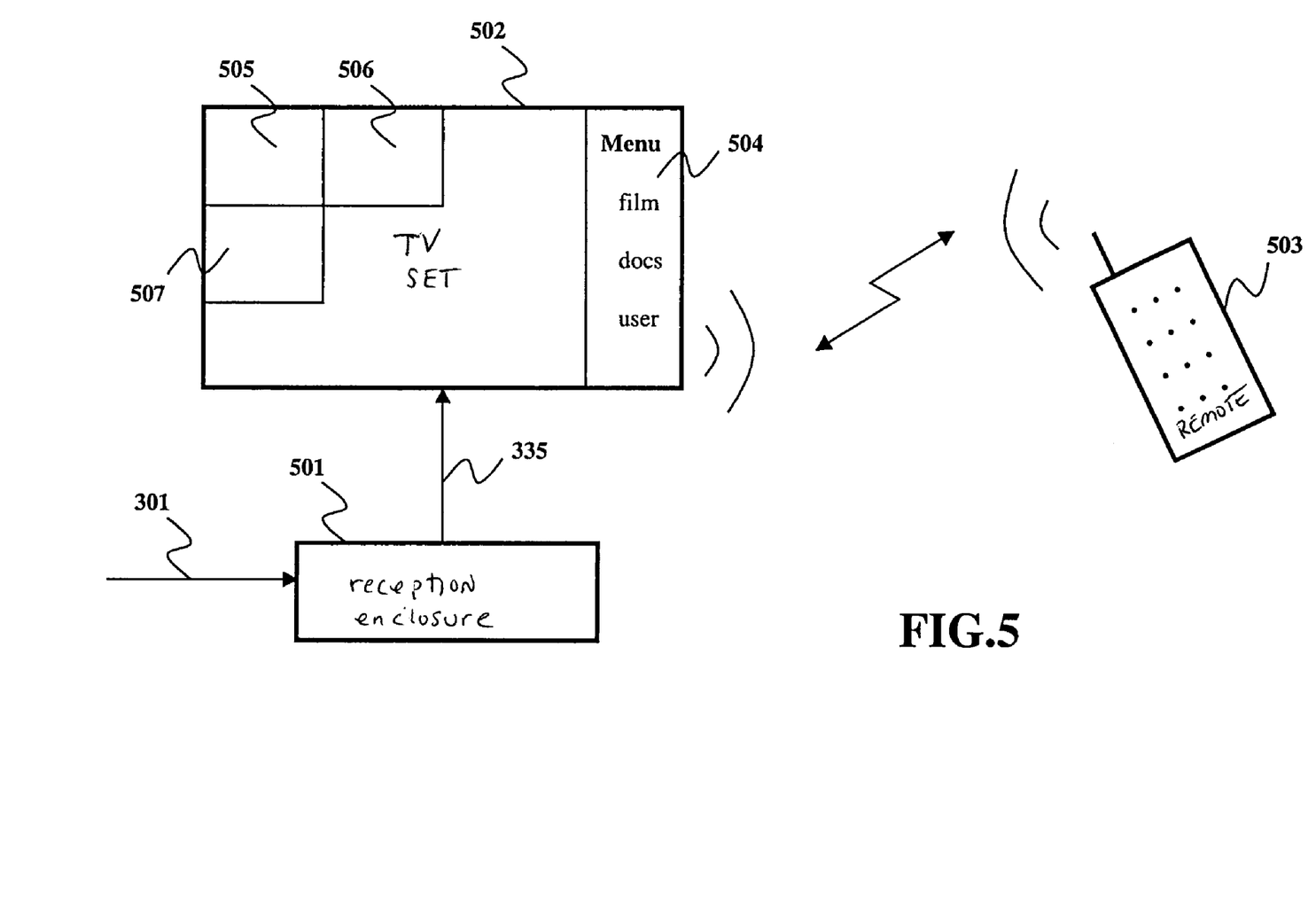
FIG. 5 illustrates a reception and processing system according to the invention.

FIG. 5 illustrates a video reception and processing system according to the invention implemented in a reception enclosure 501, particularly of the set-top box type. This enclosure receives the signal 301 as described in the foregoing and generates the signal 335 as its output, carrying in particular the mosaic of TV programs and/or the TV program selected by the user, which are displayed on the user's television set 502. The user has a remote control 503 available, allowing interaction with the video/graphical content displayed on the television set 502.

The display area comprises an area 504 allowing a menu to be displayed from which the user chooses the type of TV program that he wishes to watch. For example, he will choose the title "film" if he wishes to watch a TV program corresponding to a film, or the title "docs" if he wishes to watch a TV program corresponding to a documentary. A sub-menu (not shown) may also be envisaged in order to present the user with sub-types. In response to this choice, the system 501 constructs a mosaic of programs with the sub-sampled video signals corresponding to the user's choice. This mosaic is displayed on the television set 502. By way of example, a mosaic of TV programs is composed of 3 sub-sampled video signals 505, 506 and 507. The user can thus select the TV program that he will watch from this mosaic.

In the menu 504, a title "user" allows the user to call a user mosaic as defined and described in FIG. 3.

With regard to the implementation of an invention of this kind in hardware terms, recourse will be made particularly to signal processors both at the level of the transmission system and the reception/processing system, said processors executing a computer program comprising a sequence of program code instructions for realizing function of means depicted in FIG. 1 to 5, said program code instructions being stored in a memory device. In particular, said program code instructions could be derived from the compilation of one or a plurality of source programs carrying out the different processing steps of the invention.

The invention claimed is:

1. A video transmission system comprising:
   a first encoder that is configured to provide a plurality of coded video signals, each coded video signal corresponding to each of a plurality of input video signals,
   a second encoder that is configured to provide a plurality of encoded sub-sampled video signals, each coded sub-sampled video signal corresponding to each input video signal,
   a combiner that is configured to associate a descriptor that characterizes each corresponding input video signal to each coded sub-sampled video signal,
   a multiplexer that is configured to multiplex the plurality of coded video signals with the plurality of coded sub-sampled video signals associated with their descriptors to provide the output video signal such that each coded video signal and each coded sub-sampled video signal is independently accessible in the output video signal.

2. A video transmission system comprising:
   a demultiplexer that is configured to generate a plurality of coded video signals from an input video signal,
   a transcoder that is configured to supply a plurality of coded sub-sampled video signals, each coded sub-sampled video signal corresponding to each coded video signal,
   a combiner that is configured to associate a descriptor that characterizes the corresponding coded video signal with each coded sub-sampled video signal,
   a multiplexer that is configured to multiplex the input video signal with the plurality of coded sub-sampled video signals associated with their descriptors to provide the output video signal such that each coded video signal and each sub-sampled video signal is independently accessible in the output video signal.

3. A video processing system comprising:
   a demultiplexer that is configured to demultiplex an input video signal to provide a plurality of coded video signals and a plurality of coded sub-sampled video signals corresponding to the plurality of coded video signals,
   a decoder that is configured to decode the coded video signals to provide decoded video signals that can be displayed on a screen,
   a data descriptor being associated with each coded sub-sampled signal in order to characterize each coded sub-sampled signal,
   that is configured to store the data descriptors and to identify each coded sub-sampled video signal based on the data descriptor, and
   an image compositor that is configured to create a mosaic from a select group of sub-sampled video signals selected from the plurality of coded sub-sampled video signals based on a user request and the data descriptors.

4. The video processing ofsystem claim 3, wherein the image compositor includes:
   an other demultiplexer that is configured to generate selected coded sub-sampled video signals,
   an other decoder that is configured to generate a decoded sub-sampled video signal from each selected coded sub-sampled video signal, and
   a video composer that is configured to compose the mosaic from the decoded sub-sampled video signals, the mosaic being capable of being displayed on the screen.

5. The video processing system of claim 4, including a request generator that is configured to provide the user request based on a selection by a user from a menu displayed on the screen.

6. The video processing system of claim 4, wherein the user request originates from a user profile.

7. The video processing system of claim 4, including a graphic interface that facilitates selection of the select group of sub-sampled video signals from the group of sub-sampled video signals displayed on the screen.

8. The video processing system of claim 5, including a user interface that facilitates selecting a sub-sampled video signal of the displayed mosaic to effect a full-screen display of the corresponding decoded video signal.

9. A receiver for a television set comprising the video processing system of claim 3.

10. The video processing system of claim 6, including a user interface that facilitates selecting a sub-sampled video signal of the displayed mosaic to effect a full-screen display of the corresponding decoded video signal.

11. The video processing system of claim 7, including a user interface that facilitates selecting a sub-sampled video signal of the displayed mosaic to effect a full-screen display of the corresponding decoded video signal.

12. A digital signal comprising:
a plurality of primary video signals coded in accordance with an MPEG-2 standard,
a plurality of secondary video signals coded in accordance with an MPEG-4 standard, each secondary video signal being obtained successively by sub-sampling and encoding each primary video signal, and
a descriptor corresponding to each secondary signal characterizing the corresponding primary video signal.

13. A video transmission method comprising:
supplying a plurality of coded video signals from a plurality of input video signals,
supplying a plurality of coded sub-sampled video signals, each sub-sampled vide signal corresponding to each input video signal,
a descriptor characterizing the corresponding input video signal with each coded sub-sampled video signal,
multiplexing the plurality of coded video signals with the plurality of coded sub-sampled video signals associated with their additional data to provide an output video signal.

14. A computer program that is configured to execute the method of claim 13 when the program is executed by a signal processor implemented in a video transmission system.

15. A video transmission method comprising:
demultiplexing an input video signal to provide a plurality of coded video signals,
supplying a coded sub-sampled video signal from each coded video signal,
associating a descriptor characterizing the corresponding coded video signal with each coded sub-sampled video signal,
multiplexing the input video signal with the plurality of coded sub-sampled video signals associated with their descriptors to provide an output video signal.

16. A computer program that is configured to execute the method of claim 15 when the program is executed by a signal processor implemented in a video transmission system.

17. A video processing method including:
generating a plurality of coded video signals from an input video signal,
decoding the coded video signals to provide decoded video signals for display on a screen,
generating a plurality of coded sub-sampled video signals from the input video signal, each coded sub-sampled video signal corresponding to a sub-sampling of each coded video signal, a data descriptor being associated with each sub-sampled signal that characterizes the coded video signal,
creating a database in which to store the data descriptors and identify the corresponding coded sub-sampled video signal,
creating a mosaic from a select group of sub-sampled video signals selected from the plurality of coded sub-sampled video signals based on the data descriptors and a user request.

18. A computer program that is configured to execute the method of claim 17 when the program is executed by a signal processor implemented in a video processing system.

* * * * *

UNITED STATES PATENT AND TRADEMARK OFFICE
CERTIFICATE OF CORRECTION

| | | |
|---|---|---|
| PATENT NO. | : 7,164,714 B2 | Page 1 of 1 |
| APPLICATION NO. | : 10/076330 | |
| DATED | : January 16, 2007 | |
| INVENTOR(S) | : Francois Martin | |

It is certified that error appears in the above-identified patent and that said Letters Patent is hereby corrected as shown below:

In column 10, line 9, delete "encoded" and insert -- coded -- sub-sampled.

In column 10, line 18, delete "the" and insert -- an -- output video.

In column 10, line 35, delete "the" and insert -- an -- output video.

In column 10, line 36, insert -- coded -- sub-sampled.

In column 10, line 48, insert -- video -- signal.

In column 10, line 49, insert -- video -- signal.

In column 10, line 52, insert -- associated -- data.

In column 10, line 54, insert -- coded -- sub-sampled.

In column 10, line 57, delete "ofsystem" and insert -- system of -- claim.

In column 11, line 32, insert -- video -- signal.

In column 11, line 38, delete "vide" and insert -- video -- signal.

In column 11, line 40, insert -- associating -- a descriptor.

In column 13, line 31, insert -- video -- signal.

Signed and Sealed this
Ninth Day of August, 2011

David J. Kappos
*Director of the United States Patent and Trademark Office*